Feb. 17, 1953     J. P. BUTTERFIELD     2,628,602
PISTON
Filed Dec. 19, 1949     2 SHEETS—SHEET 1
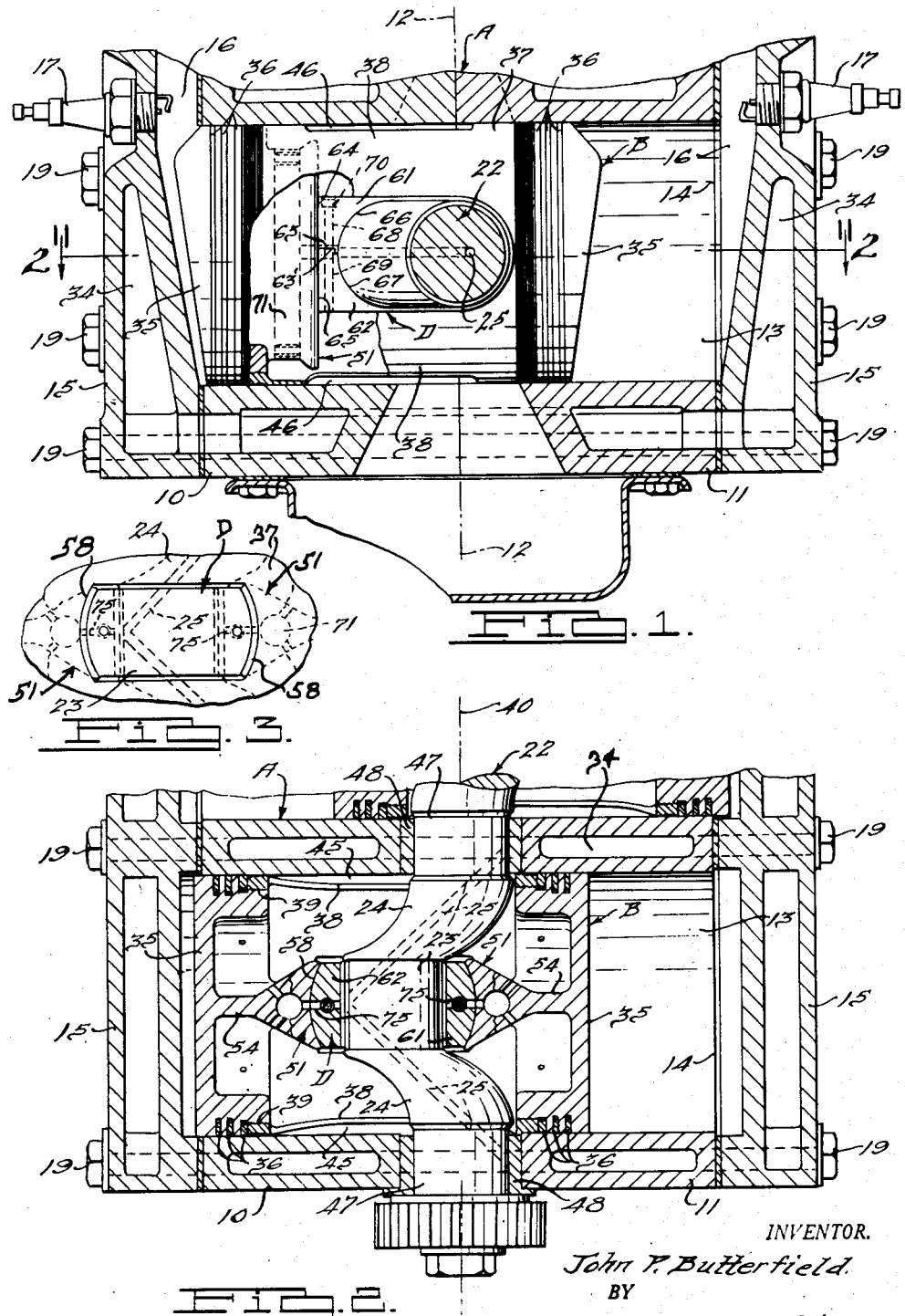
INVENTOR.
John P. Butterfield.
BY
Harness and Harris
ATTORNEYS.

Feb. 17, 1953  J. P. BUTTERFIELD  2,628,602
PISTON
Filed Dec. 19, 1949  2 SHEETS—SHEET 2
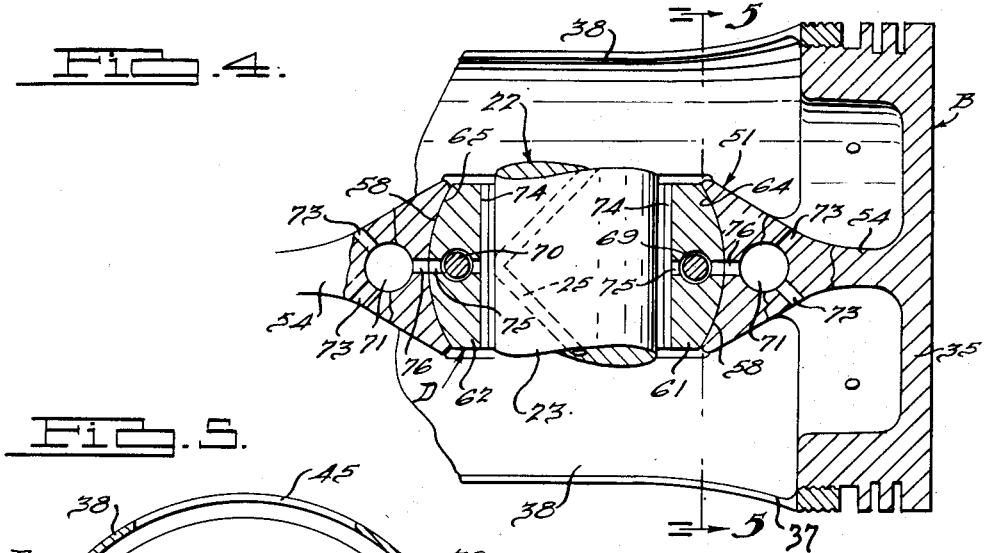
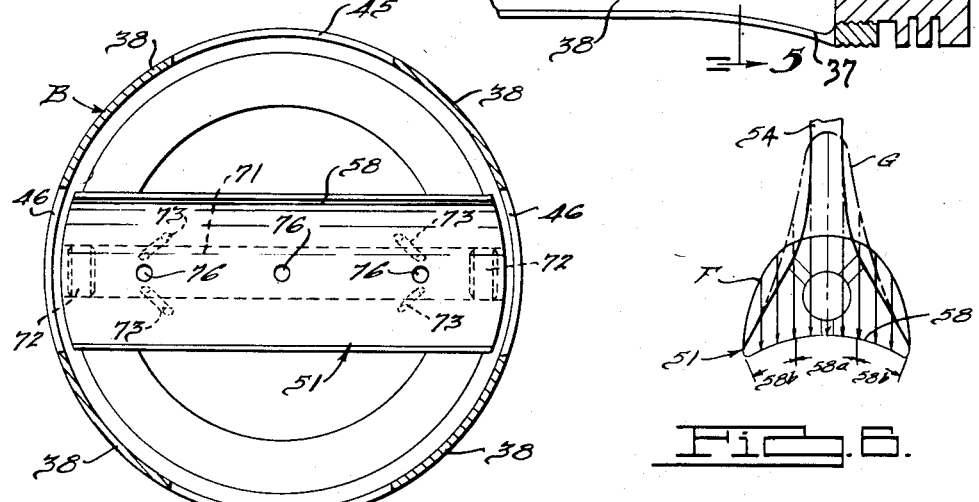
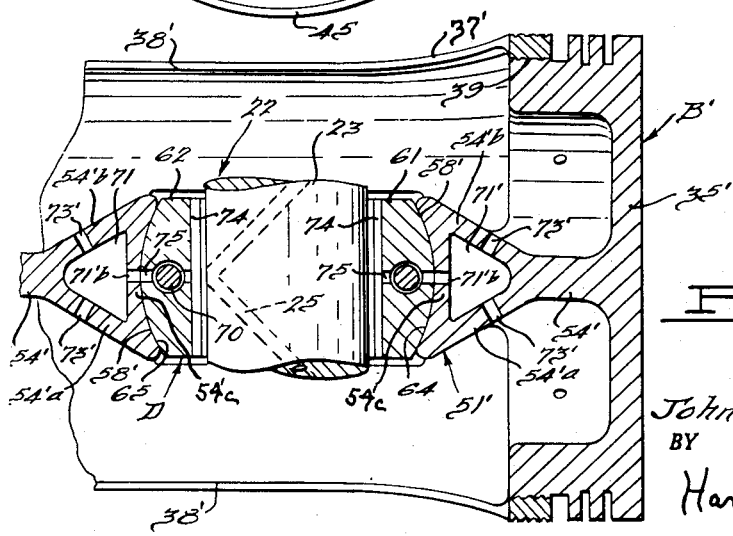
INVENTOR.
John P. Butterfield.
BY
Harness and Harris
ATTORNEYS.

Patented Feb. 17, 1953

2,628,602

UNITED STATES PATENT OFFICE 2,628,602

PISTON

John P. Butterfield, Grosse Pointe Woods, Mich., assignor to Chrysler Corporation, Highland Park, Mich., a corporation of Delaware Application December 19, 1949, Serial No. 133,926

21 Claims. (Cl. 123—41.35)

This invention relates to internal combustion engines of the double acting type and is primarily concerned with the pistons used therein and the means employed to connect the pistons of such engines to the associated crankshaft.

In the double acting type of engine a double-ended piston is employed for reciprocatory movement in each engine cylinder bore, such engines being arranged to provide a combustion chamber at each end of each cylinder for cooperation with one end of the double-ended piston mounted therein. Engines of this general type are known in the art and employ a crankshaft which usually extends through and is directly operably connected to the double-ended piston without the use of a connecting rod such as is employed in the more conventional type of internal combustion engine. For a more detailed description of this particular type of engine, see the copending applications of A. G. Herreshoff, Serial No. 16,801, filed March 24, 1948, and Serial No. 84,081, filed March 29, 1949, now Patent 2,581,326, January 1, 1952, the applications of John P. Butterfield, Serial Nos. 16,645–16,650, filed March 24, 1948, the application of A. J. Slemmons, Serial No. 80,729, filed March 10, 1949, now Patent 2,588,666, March 11, 1952, and the application of R. M. Rodger, Serial No. 74,316, filed February 3, 1949.

The double acting type of engine offers many advantages over the more conventional types of engines but certain difficulties in the manufacture, assembly and operation of such an engine have heretofore been deemed to be of such a bothersome or supposedly insurmountable character as to discourage the use of this type of engine.

One of the difficulties experienced with this type of engine has been in providing a practicable operating connection between the piston and crankshaft which connection will distribute the bearing loads more or less uniformly over the surfaces of the piston slideways that are slidably engaged by the crankshaft bearing block.

It is a primary object of this invention to provide a piston construction with an interiorly disposed slideway adapted to be slideably engaged by a crankshaft bearing block wherein the slideway and support therefor are formed in a manner adapted to distribute the bearing block loads more or less uniformly over the bearing block engaged surfaces of the slideway and thereby reduce the unit pressures on these engaged parts during engine operation.

It is another object of this invention to provide a piston construction having integrally formed, interiorly disposed, opposed slideways adapted to be slidably engaged by a crankshaft bearing block wherein the slideways and the supports therefor are formed so as to distribute the bearing block loads uniformly over the engaged slideway surfaces, the arrangement being such that the lubricant covered, block engaged areas of the slideways are also increased so as to materially increase the impact cushioning properties of the lubricant film that is distributed between the engageable surfaces of the piston slideways and the associated bearing block.

It is still another object of this invention to provide a piston construction having interiorly disposed, opposed, crankshaft bearing block engageable slideways wherein the slideways and the supports therefor are formed so as to provide a means for controlling the unit pressures applied to the slideway surfaces by the bearing block, the slideway construction further providing a means whereby lubricant or the like may be sprayed upon the interior surfaces of the piston to provide a means for cooling the surfaces of the piston that are subjected to the heat of fuel combustion, friction, heat conduction, or the like.

It is still another object of this invention to provide a piston construction having an interiorly disposed, transversely extending slideway adapted to be slidably engaged by a crankshaft bearing block wherein the slideway and the support therefor are formed in such a manner that the slideway bearing surface is sufficiently flexible to conform to the engageable surface of the crankshaft bearing block and thereby provide for reduced unit pressures and reduced wear. As a result of the increased and more or less uniform flexibility of the slideways resulting from this invention the film of lubricant that flows between all portions of the slidably engaged surfaces of the slideways and bearing block is spread over a greater area to provide a more effective means for cushioning the impact loads transmitted by the piston. The uniform distribution of lubricant between the engageable surfaces of the bearing block and piston slideways also improves the life of the engine parts and tends to reduce engine operating noise.

Further objects and advantages of my invention reside in the novel combination and arrangement of parts hereinafter described and disclosed in the accompanying drawings in which:

Figure 1 is a transverse sectional elevational view through a double acting engine cylinder block structure showing a crankshaft and associated piston connected by a bearing block and piston slideway embodying my invention;

Figure 2 is a sectional plan view of the structure shown in Figure 1, the view being taken as indicated by the reference line 2—2 of Figure 1;

Figure 3 is a fragmentary side elevational view of a portion of the piston and the bearing block connection to the spaced, opposed, piston slideways;

Figure 4 is an enlarged fragmentary, sectional elevation of a portion of the piston and the crankshaft and bearing block structure shown in Figure 2;

Figure 5 is a sectional elevational view of the interior of the piston shown in Figures 1–4, the view being taken along the reference line 5—5 of Figure 4 and showing the piston with the bearing block removed;

Figure 6 is a fragmentary end elevation of the piston slideway with stress concentration graphs superimposed thereon to show the changes in stress concentration resulting from application of this invention; and Figure 7 is a sectional elevational view similar to Figure 4 of a modified form of construction embodying this invention.

In general, the engine utilizing pistons of the type embodying this invention comprises a cylinder block structure A formed of component or complementary half portions 10 and 11 having planar face contact in a plane 12—12 which is vertical for the illustrated positioning of the engine in Figure 1. Each portion of the cylinder block structure A is formed with a half-part of a cylinder 13 of substantially uniform diameter extending between the opposite side faces 14 of the block structure A. Each exposed end of the cylinder 13 is closed by a cylinder head 15 providing a combustion chamber 16. Suitable intake and exhaust valves (not shown) control inlet of the fuel mixture to the combustion chambers 16 and discharge of the exhaust gas from the combustion chambers. Combustion chamber fuel ignition means such as the spark plugs 17 are provided although other types of fuel ignition may be used.

The cylinder block portions 10 and 11 are brought together and the cylinder heads 15 maintained in their illustrated assembled positions by a plurality of through bolt assemblies 19 which extend through the block portions and cylinder heads. For an engine of the liquid circulating cooled type, as illustrated, the cylinder heads 15 and block portions 10, 11 are provided with cored intercommunicating coolant passages 34.

Reciprocating within the typical illustrated cylinder 13 is a piston structure B having a head portion 35 at each end thereof arranged to cooperate with the combustion chambers 16 of the cylinder heads 15. The piston structure B carries a set of rings 36 adjacent each of its head portions 35 and the oppositely disposed piston head portions 35 are connected together by an intermediate skirt structure 37 herein illustrated as comprising a plurality of circumferentially spaced piers or tie-portions 38. The skirt portion 37 is connected to the associated head portions 35 by suitable connections 39 of the sweated, shrunk, or welded type if the piston is a composite unit having different materials forming the head and skirt portions. The piston structure B may be formed as a single casting or as a composite unit, such as shown in the application of Alexander G. Herreshoff, Serial No. 84,081, filed March 29, 1949, now Patent 2,581,326, January 1, 1952.

The skirt portion 37 of piston structure B is provided with two pairs of diametrically disposed, axially extending openings or slots 45 and 46, respectively, which slots are bounded circumferentially of the piston by the piers 38. The slots 45 are adapted to receive the crankshaft 22 and to accommodate reciprocation of the piston structure B relative to the crankshaft 22 which is rotatable about its axis 40, the crankshaft having journal portions 47 mounted in bearings 48 carried by component semi-cylindrical bearing openings formed in the opposed inner faces of the cylinder block portions 10 and 11. The slots 46, circumferentially rotated ninety degrees from the slots 45 (see Fig. 5), are adapted to receive the end portions of the internal transversely extending, opposed, piston slideways 51 which are subsequently described in detail.

Associated with each cylinder and piston structure of the engine is a cylindrical crankpin portion 23 of the crankshaft 22. Each crankpin portion 23 is connected to an adjacent pair of crankshaft journal portions 47 by the obliquely extending crankshaft portions 24, the crankpin 23 and oblique connecting portions 24 being disposed within the hollow chamber formed interiorly of piston structure B intermediate the heads 35 of the double-ended piston structure.

The force transmitting connection between each piston structure B and the crankshaft 22 comprises the internal, opposed, slideways or bearing block guides 51 which are carried by each head portion 35 and arranged to extend transversely to the axis of the piston structure B, and a bearing block D operatively carried by and disposed between the crankshaft crankpin 23 and the piston slideways 51. The parts 51, D and 23 are so constructed and arranged as to provide a sliding, rockable bearing connection between the piston structure B and the crankshaft crankpin 23.

The similar, opposed, piston carried, bearing block slideway portions 51 are preferably cast as portions of the piston heads 35. Slideways 51 are connected to the heads 35 by the depending piston head flanges or webs 54. The webs 54 sweep into the associated guideway portions 51 in a manner that supports the slideways 51 as more or less rigid parts of the piston head structures 35. By the arrangement shown the slideway portions 51 are thus spaced from each other in a direction axially of the piston structure and present opposed, arcuately-shaped bearing surfaces 58 facing each other. Each slideway bearing surface 58 is a portion of a cylindrical surface which is adapted to slidably and rockably engage a mating cylindrically formed bearing surface on the crankshaft bearing block D that is subsequently described. As will be seen from Figs. 1 and 5 the slideways 51 extend transversely through the piston, the opposite ends of the slideways 51 being open and disconnected from the piers 38 of the piston skirt portion 37. Each slideway 51 is directly supported by a piston web portion 54 that depends from the piston head 35. Each web portion 54 extends the full length of the associated slideway 51 and is flared out at its inner end to cover the width of the slideway 51. As it is practically essential to arrange the web portion 54 so that it extends along and is aligned with the central portion 58a (see Fig. 6) of the slideway 51, it has been found that in conventional piston constructions of the general type using solid, centrally arranged web portions 54, the solid webs provide the slideways 51 with a higher operational stress concentration and a maximum rigidity along the central portion 58a (see Fig. 6) of the bearing surface 58 while the edge or side portions 58b of the slideway bearing surfaces 58 are very lightly stressed during engine operation and are relatively flexible compared to the portion 58a. The curve G of Fig. 6 represents the stress concentration during engine operation in a slideway supported by a longitudinally extending solid web member. When a solid web member is used to support the slideway 51 it has been found that the increased rigidity and relatively high, non-uniform stress concentration across the width of the bearing surface 58 during engine operation has a tendency to increase wear along the central portions 58a of the slideways and to even cause the slidably engaged bearing block D and the slideways 51 to seize and cause engine destruction. The high stress concentration and increased rigidity along the central portions 58a of the slideways further prevents maintenance of the necessary lubricating film across the entire width of the bearing surfaces 58 of the slideways and this increases engine wear and reduces the impact cushioning properties of the lubricant film.

This invention remedies the aforementioned difficulties by forming the slideway 51 and the supporting web portion 54 with a bore 71 or the like that extends lengthwise of the slideway 51. This bore 71 is aligned with the central portion 58a of the slideway bearing surface 58. The bore 71 reduces the rigidity of the central section 58 of the slideway 51 and tends to create a more or less uniform degree of flexibility over the entire width of the slideway bearing surface 58. The increased flexibility of the central slideway portion 58a permits the entire width of the slideway surface 58 to assume a uniform bearing fit about the adjacent, slidably engaged curved surface of the bearing block and this brings about a substantially uniform bearing load stress distribution across the width of the slideway bearing surface 58 during engine operation. As a result of the bore 71 providing a means for obtaining a substantially uniform application of the bearing loads over the entire width of the slideway bearing surfaces 58 it is obvious that this construction materially reduces the unit pressures applied to the bearing surfaces 58 and this tends to reduce bearing block and slideway wear. At the same time the uniform pressure distribution facilitates the maintenance of the necessary film of lubricant between these slideably engaged surfaces of the slideway 51 and bearing block D so as to lubricate the engaged elements and provide improved means for cushioning impact loads. As the bore 71 reduces the rigidity and stiffness of the central portion 58a of the slideway bearing surface 58, it causes the stress loads on the slideway 51 to be substantially uniformly applied to the edge areas 58b as well as the central area 58 a driving engine operation. The stress distribution across the width of the slideway bearing surface 58 when the bore 71 is included in the web structures 54 is shown by the curve F in Figure 6.

Not only does the bore 71 cause a uniform stress distribution across the slideway 58 and thus improve wear of the slidably engaged slideway 51 and bearing block D but in addition the bore 71 can be made to serve an additional function. It will be noted that the ends of the bore 71 are closed by plugs 72 (see Figure 5). The closed off bores 71 may thus provide conduits for the transmission of pressurized lubricating oil to the spray holes 73. Oil forced through the bore 71 and spray holes 73 will spray out and impinge upon the inner sides of the piston skirt 37 and piston head 35. This oil spray thereby provides a means to transfer heat from the warmer portions of the piston. The bores 71 may thus provide a means to cool the piston and improve engine operating efficiency.

Cooling oil may reach the web bores 71 through the conventional lubrication conduit system that is provided to lubricate the connections between the crankpin 23 and bearing block D and the connections between the bearing block D and the slideways 51. The crankshaft 22 has the usual oil bores 25 for transmitting pressurized lubricating oil to the crankpins 23. The crankpin journal surfaces of the bearing block D are formed with oil distribution channels or slots 74 that disperse the lubricating oil around the crankpin journal surfaces. The bearing block D is pierced by sets of oil bores 75 that conduct lubricating oil from the oil channels 74 to the slideway bearing surfaces 58. During reciprocation of the bearing block D along the slideways 51 the oil bores 75 in the bearing block will become aligned with the oil bores 76 in the slideways 51 and pressurized lubricant will be forced into the conduit bores 71, through the spray holes or orifices 73 and sprayed upon the inner surfaces of the piston B.

The bearing block structure D disclosed herein comprises complementary bearing block portions 61 and 62, having stepped contacting faces 63 and 63', respectively, which faces are arranged to extend transversely of and normal to the parallel, cylindrically formed, slideway engageable bearing surfaces 64 and 65 of block portions 61 and 62 respectively. The cylindrical, slideway engageable bearing surfaces 64 and 65 are generated about the axis of generation of the slideway bearing surfaces 58 so as to conform to the curvature of the slideway bearing surfaces 58. Bearing surfaces 64 and 65 of the bearing block D are adapted to be slidably and rockably received in the piston slideways 51 for mating engagement with the slideway bearing surfaces 58. Each of the bearing block portions 61 and 62 is formed with a semi-cylindrical crank portion journal opening 66 and 67, respectively, which latter openings are adapted to be mounted about the associated crankshaft crankpin portion 23. Each of the bearing block portions 61 and 62 is provided with a pair of bolt receiving bores 68 and 69, respectively, adapted to receive the tie bolts 70. Tie bolts 70 have their heads countersunk in the bore openings 68 in bearing block portion 61 and their opposite threaded end portions connected to threaded portions of the bores 69 in bearing block portion 62 so as to lock the bearing block portions is assembled position about the crank portion 23.

The modified form of the invention shown in Fig. 7 is similar to the Fig. 5 construction but differs therefrom in the specific shape of the stress relieving and distributing opening 71'. In Figs. 1–5 the bores 71 are shown as cylindrical openings which are designed to remove a considerable amount of material from that part of the slideway structure directly supporting the central portion 58a (see Fig. 6) of the slideway bearing surface 58. The bores 71 in the Figs. 1–5 embodiment of the invention thus reduce the rigidity of the central portion of the slideway and provide a means for securing a more or less uniform, relatively low unit bearing pressure over the full width of the slideway during engine operation. In Figs. 1–5 it will be noted that the slideway material located between the bearing surface 58 and the bore 71 varies considerably in thickness across the width of the slideway. With the construction shown in Fig. 7 the openings 71' through the slideways 51' are substantially triangular in shape with the material along the base side 54'c of the opening 71' providing a plate-like element of substantially uniform thickness that extends parallel to the adjacent slideway bearing surface 58' for substantially the full width of the slideway. The arrangement shown in Fig. 7 is intended to provided an even more uniform stress distribution and a higher degree of flexibility in the slideway 51' than the construction shown in Figs. 1-5. The forces applied to the head 35' of the piston B' are transmitted through the piston web 54' and down the diverging web leg portions 54'a and 54'b so as to be directly applied at the side edges of the slideway bearing surface 58'. The increased flexibility of the central portion of the slideway bearing surface 58' due to the specific shape of the openings 71' causes the central portion of the slideway bearing surface 58' to assume a form fit about the adjacent curved bearing surface of the bearing block D. The ability of the slideway 51 to automatically adjust itself to fit about the bearing block D provides a means that compensates for any mismatch of these slideably engageable surfaces and accordingly tends to distribute the bearing loads more or less uniformly over the entire width of the slideway surface. The openings 71' are also adapted to serve as oil conduit channels to spray cooling oil on the inner piston walls as previously explained with regard to the Fig. 1-5 modification of this invention. Similar reference numerals have been applied to similar parts of the pistons in Figs. 5 and 7 with the Fig. 7 numerals being primed to distinguish them from the corresponding Fig. 5 numerals.

In forming the stress distributing openings 71 or 71' in the piston slideways 51 and 51', respectively, it is thought to be obvious that the openings may be cast as a part of the piston head casting process or the slideway may be cast solid and the opening therethrough subsequently formed by boring or broaching or the like.

I claim:

1. A piston comprising a head portion and an encircling, depending, skirt portion, a bearing block slideway depending from the interior surface of said head portion and extending diametrically of said skirt portion, said slideway including a diametrically disposed bearing surface adapted to be slidably engaged with a bearing block, and integrally formed means extending lengthwise of said slideway adapted to increase the flexibility of the bearing surface of the slideway and to control the unit pressures applied to the slideway bearing surface as a result of axially directed forces applied to said head portion and slideway.

2. A piston comprising a head portion and an encircling, depending, skirt portion, a bearing block slideway depending from said head portion and extending transversely to said skirt portion, said slideway including a transversely extending bearing surface adapted to be slidably engaged with a bearing block, and an opening extending lengthwise of said slideway adapted to increase the flexibility of the bearing surface of the slideway and to control the pressure distribution across the slideway bearing surface as a result of forces applied to said head portion and transmitted to said bearing block by said slideway.

3. A piston comprising a head portion and an encircling, depending, skirt portion, a web depending from the inner surface of said head portion, a bearing block slideway supported from the free end of said web and arranged to extend transversely to said skirt portion, said slideway having an internally disposed bore extending therethrough in a direction longitudinally of the slideway providing means to reduce the rigidity of the slideway bearing surface.

4. A piston comprising a head portion and an encircling, depending, skirt portion, a thrust transmitting element depending from the inner surface of said head portion, a bearing block slideway supported from the free end of said thrust transmitting element and arranged to extend transversely to said skirt portion, said slideway having an interiorly disposed bore extending therethrough in a direction longitudinally of the slideway, said bore being aligned with the connection of said thrust transmitting element to said slideway and extending substantially the length of the slideway.

5. A piston comprising a head portion and an encircling, depending, skirt portion, a web depending from the inner surface of said head portion, a bearing block slideway supported from said web and arranged to extend transversely to said skirt portion, said slideway having a bore extending therethrough in a direction longitudinally of the slideway, and means associated with said bore adapted to pass pressurized fluid through said bore and to spray said pressurized fluid against the inner surfaces of the piston.

6. A piston comprising connected head and skirt portions, a bearing block slideway supported from said head portion interiorly of said piston, said slideway having a bearing surface that extends transversely of said piston skirt portion, an opening piercing said slideway in a lengthwise direction, said opening being located adjacent the central portion of said slideway bearing surface and in alignment with the path of force transmission between said head portion and said slideway bearing surface.

7. A piston comprising connected head and skirt portions, a bearing block slideway supported from said head portion interiorly of said piston, said slideway having a bearing surface that extends transversely of said piston skirt portion, an opening of circular cross-sectional configuration piercing said slideway in a lengthwise direction, said opening being located adjacent the central portion of said slideway bearing surface and in alignment with the path of force transmission between said head portion and said slideway bearing surface.

8. A piston comprising connected head and skirt portions, a bearing block slideway supported from said head portion interiorly of said piston, said slideway having a bearing surface that extends transversely of said piston skirt portion, an opening of substantially triangular cross-sectional configuration piercing said slideway in a lengthwise direction, said opening being located adjacent the central portion of said slideway bearing surface and in alignment with the path of force transmission between said head portion and said slideway bearing surface.

9. A piston comprising connected head and skirt portions, a bearing block slideway supported from said head portion interiorly of said piston, said slideway having a bearing surface that extends transversely of said piston skirt portion, an opening piercing said slideway in a lengthwise direction, said opening being located adjacent the central portion of said slideway bearing surface and in alignment with the path of force transmission between said portion and said slideway bearing surface, and conduit means connected to said opening adapted to admit pressurized fluid to said opening and to spray pressurized fluid from said opening against the inner surfaces of said piston.

10. A double-ended piston comprising spaced, opposed, substantially cylindrically shaped, head portions connected by a hollow, cylindrically shaped, skirt portion, a bearing block slideway depending from the inner opposed face of each head portion, each slideway including a bearing surface that extends transversely of the piston skirt portion, the bearing surfaces being arranged in alignment with but spaced from each other, and integrally formed means associated with each slideway rendering the longitudinally extending central portion of each slideway more flexible than the adjacent edge portions of the slideway.

11. A double-ended piston comprising spaced, opposed, substantially cylindrically shaped, head portions connected by a hollow, cylindrically shaped, skirt portion, a bearing block slideway depending from the inner opposed face of each head portion, each slideway including a bearing surface that extends transversely of the piston skirt portion, the bearing surfaces being arranged in alignment with but spaced from each other, and integrally formed means associated with each slideway adapted to provide supporting structure for the slideway that will cause a substantially uniform pressure distribution throughout the slideway bearing surface when the slideway is loaded by force applied to the associated piston head portion.

12. A double ended piston comprising a pair of spaced, opposed, substantially cylindrically shaped, head portions connected by a hollow, substantially cylindrically shaped, skirt portion, a relatively narrow web portion depending from the inner surface of each head portion arranged to extend longitudinally of the piston, a relatively wide bearing block slideway supported by each web portion, each slideway including a bearing surface that extends transversely of the piston skirt portion, the connection of each slideway to the associated web portion being in alignment with the longitudinally extending central portion of each slideway bearing surface, and an opening extending longitudinally through each slideway disposed in alignment with and located between the slideway bearing surface and the connection of the slideway to its associated head portion.

13. A double-ended piston as defined in claim 12 including means associated with the opening extending through each slideway whereby pressurized fluid may be passed through each slideway opening and sprayed upon the inner surfaces of the piston.

14. A double-ended piston as defined by claim 12 wherein the opening through each slideway is of cylindrical cross-sectional configuration.

15. A double-ended piston as defined by claim 12 wherein the opening through each slideway is of substantially triangular shaped cross-sectional configuration.

16. A double ended piston as defined by claim 12 wherein the opening through each slideway is of such shape as to cause the longitudinally extending central portion of the slideway bearing surfaces to be less rigid than the adjacent side portions of the slideway bearing surfaces.

17. A double ended piston as defined by claim 12 wherein the opening through each slideway is of such shape and so located that forces applied to the piston heads and transmitted to the slideway bearing surfaces through the associated webs will be substantially uniformly distributed over the bearing surfaces.

18. A piston comprising a head portion and an encircling, depending, skirt portion, a web portion depending from the inner surface of the head portion arranged to extend longitudinally of the piston, a bearing block slideway supported by said web portion, said slideway including a bearing surface that extends transversely of the piston skirt portion and is disconnected therefrom, the connection of the web portion to the slideway being aligned with the longitudinally extending central portion of the slideway bearing surface, and an interiorly disposed, opening extending longitudinally of the slideway arranged in alignment with the central portion of the bearing surface and the connection between the slideway and the web portion.

19. A piston comprising a head portion and an encircling, depending, skirt portion, a web portion depending from the inner surface of the head portion arranged to extend longitudinally of the piston, a bearing block slideway supported by said web portion, said slideway including a bearing surface that extends transversely of the piston skirt portion and is disconnected therefrom, the connection of the web portion to the slideway being aligned with the longitudinally extending central portion of the slideway bearing surface, and an interiorly disposed, opening extending longitudinally of the slideway arranged in alignment with the central portion of the bearing surface and the connection between the slideway and the web portion, said opening being of such a shape that forces transmitted to the slideway by the web portion are substantially uniformly applied across the full width of the slideway bearing surface.

20. A piston comprising a head portion and an encircling, depending, skirt portion, a web portion depending from the inner surface of the head portion arranged to extend longitudinally of the piston, a bearing block slideway supported by said web portion, said slideway including a bearing surface that extends transversely of the piston skirt portion and is disconnected therefrom, the connection of the web portion to the slideway being aligned with the longitudinally extending central portion of the slideway bearing surface, and an interiorly disposed, opening extending longitudinally of the slideway arranged in alignment with the central portion of the bearing surface and the connection between the slideway and the web portion, and bore means associated with the slideway opening adapted to provide means for passing pressurized fluid through said opening to effect a spray of the pressurized fluid upon the inner surfaces of the piston.

21. In a piston comprising an annular head portion and an encircling, depending, skirt portion, a thrust transmitting member connected to the interior of said piston head portion and arranged to extend axially of the piston, a bearing member carried by the free end of said thrust transmitting member having a bearing surface extending transversely to said skirt portion, said bearing member having integrally formed means extending lengthwise of the said bearing surface arranged to increase the flexibility of the bearing surface.

JOHN P. BUTTERFIELD.

REFERENCES CITED

The following references are of record in the file of this patent:

UNITED STATES PATENTS

| Number | Name | Date |
|---|---|---|
| 1,042,505 | Twombly | Oct. 29, 1912 |
| 2,086,302 | Schlenker | July 6, 1937 |
| 2,183,031 | Rippingille | Dec. 12, 1939 |
| 2,230,893 | Bachle | Feb. 4, 1941 |
| 2,304,891 | Dickson | Dec. 15, 1942 |